(12) United States Patent
Kim et al.

(10) Patent No.: US 10,030,496 B2
(45) Date of Patent: Jul. 24, 2018

(54) METHOD FOR PRODUCING SYNTHETIC GAS BY USING SOLID ACID

(71) Applicant: KOREA INSTITUTE OF SCIENCE AND TECHNOLOGY, Seoul (KR)

(72) Inventors: Hong Gon Kim, Seoul (KR); Min Jae Ko, Cheonan-si (KR); Ju Hee Kim, Seoul (KR); Young Sang Cho, Seoul (KR); Jae Ik Kim, Seoul (KR); Kang-Bong Lee, Seoul (KR); In-Hwan Oh, Namyangju-si (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 389 days.

(21) Appl. No.: 14/439,224

(22) PCT Filed: Aug. 1, 2013

(86) PCT No.: PCT/KR2013/006946
§ 371 (c)(1),
(2) Date: Apr. 28, 2015

(87) PCT Pub. No.: WO2014/069756
PCT Pub. Date: May 8, 2014

(65) Prior Publication Data
US 2015/0292312 A1    Oct. 15, 2015

(30) Foreign Application Priority Data

Oct. 29, 2012 (KR) ......................... 10-2012-0120235

(51) Int. Cl.
*E21B 43/295* (2006.01)
*C01B 3/06* (2006.01)
*E21B 43/16* (2006.01)

(52) U.S. Cl.
CPC .............. *E21B 43/295* (2013.01); *C01B 3/06* (2013.01); *E21B 43/168* (2013.01); *Y02E 60/366* (2013.01)

(58) Field of Classification Search
CPC ........ E21B 43/29; E21B 43/295; E21B 43/16; E21B 43/168; C01B 3/06
See application file for complete search history.

(56) References Cited

U.S. PATENT DOCUMENTS

| | | | |
|---|---|---|---|
| 5,407,756 A * | 4/1995 | Sprouse ............. | H01M 8/0656 429/417 |
| 5,506,066 A * | 4/1996 | Sprouse ............ | H01M 8/04074 429/418 |
| 6,468,499 B1 | 10/2002 | Balachandran et al. | |

(Continued)

OTHER PUBLICATIONS

Cho et al. "Hydrogen production by splitting water on solid acid materials by thermal dissociation", International Journal of hydrogen energy, May 4, 2011, pp. 8192-8202, vol. 36.

*Primary Examiner* — Zakiya W Bates
*Assistant Examiner* — Crystal J Miller
(74) *Attorney, Agent, or Firm* — Goldilocks Zone IP Law (57) ABSTRACT

The present disclosure relates to a method for producing a synthesis gas using a solid acid, more particularly to a method for producing a synthesis gas using a solid acid capable of remarkably decreasing production of environmental pollutants such as carbon dioxide, which includes producing hydrogen by reacting a solid acid with water and producing a synthesis gas by reacting the produced hydrogen with a carbon compound.

17 Claims, 2 Drawing Sheets

(56) References Cited

U.S. PATENT DOCUMENTS

| | | | |
|---|---|---|---|
| 7,863,340 B2 | 1/2011 | Severinsky | |
| 8,277,631 B2* | 10/2012 | Eastman | C10G 2/30 |
| | | | 205/450 |
| 8,419,922 B2* | 4/2013 | Grimes | B01J 3/04 |
| | | | 205/637 |
| 8,828,216 B2* | 9/2014 | Grimes | B01J 3/04 |
| | | | 205/450 |
| 9,315,910 B2* | 4/2016 | Eastman | C25B 3/04 |
| 2003/0065042 A1 | 4/2003 | Shaw | |
| 2007/0244208 A1 | 10/2007 | Shulenberger et al. | |
| 2008/0283411 A1* | 11/2008 | Eastman | C10G 2/30 |
| | | | 205/343 |
| 2009/0277799 A1* | 11/2009 | Grimes | B01J 3/04 |
| | | | 205/350 |
| 2009/0277800 A1* | 11/2009 | Grimes | B01J 3/04 |
| | | | 205/637 |
| 2010/0205856 A1 | 8/2010 | Kubic et al. | |
| 2012/0087990 A1* | 4/2012 | Shiga | C02F 1/461 |
| | | | 424/600 |
| 2012/0329657 A1* | 12/2012 | Eastman | C10G 2/30 |
| | | | 505/150 |
| 2015/0183638 A1* | 7/2015 | Clark, Jr. | C01B 3/065 |
| | | | 423/657 |
| 2016/0194766 A1* | 7/2016 | Eastman | C10G 2/30 |
| | | | 204/277 |

* cited by examiner

METHOD FOR PRODUCING SYNTHETIC GAS BY USING SOLID ACID

CROSS REFERENCE TO RELATED PATENT APPLICATIONS

This application claims the benefit under 35 U.S.C. Section 371, of PCT International Application No. PCT/KR2013/006946, filed Aug. 1, 2013, which claimed priority to Korean Patent Application No. 10-2012-0120235, filed Oct. 29, 2012, the disclosures of which are hereby incorporated by the references.

TECHNICAL FIELD

The present disclosure relates to a method for producing a synthesis gas using a solid acid, more particularly to a method for producing a synthesis gas using a solid acid capable of remarkably decreasing production of environmental pollutants such as carbon dioxide, which includes producing hydrogen by reacting a solid acid with water and producing a synthesis gas by reacting the produced hydrogen with a carbon compound.

BACKGROUND ART

The consistent combustion of fossil fuels such as petroleum, coal, etc. by humans has increased the production of greenhouse gases such as carbon dioxide and led to global warming. As a result, environmental destruction has proceeded globally and it has reached the stage where the fall of mankind has to be concerned about. To prevent such disaster for the earth and the human race, efforts to reduce the production of greenhouse gases such as carbon dioxide by decreasing the use of fossil fuels are necessary. In this regard, researches on the utilization of nuclear energy, solar energy and natural gas such as shale gas, whose main constituent is methane, are increasing recently.

However, as for the nuclear energy, the sources will be depleted some day and accidents may lead to catastrophic disaster. The solar energy is low in utilization efficiency and thus requires a very high cost.

Meanwhile, although the natural gas consisting primarily of methane releases carbon dioxide during combustion, the amount is ½ or less as compared to the fossil fuels such as coal, petroleum, etc. Accordingly, the global warming problem can be solved or greatly relieved. In particular, hydrogen produced underground from water splitting by natural rock, whose main components are solid acids, reacts with carbon compounds existing in underground rock formations, thereby producing natural gas such as shale gas. Only with the shale gas reserves proven thus far, it is estimated that the human energy needs can be satisfied consistently for at least 100 years. Accordingly, if it is possible to produce a synthesis gas based on the principle by which natural gas is produced, the energy problem of humankind may be solved ultimately without environmental destruction.

The processes wherein hydrogen is produced from water and methane gas is produced by reaction of the hydrogen with a carbon compound include an artificial process wherein coal is reacted with water at high temperature to obtain a synthesis gas and a natural process wherein natural gas such as shale gas is produced underground.

In the existing artificial process for producing a synthesis gas, a lot of air pollutants such as carbon dioxide are generated during the reaction of coal with water. In contrast, when hydrogen is produced naturally from water splitting by rock catalysts as in production of natural gas underground, oxygen generated as byproduct of the water splitting is removed as it is used to oxidize reductive materials existing in rocks.

The inventors of the present disclosure have recognized that, when water is split using a natural rock catalyst by mimicking the natural process described above and oxygen is removed by a reductive material existing in rock or when water is split using a solid acid catalyst and oxygen is removed by a reductive material such as iron and the produced hydrogen is reacted with a carbon compound to produce a synthesis gas having a compositional distribution similar to that of natural gas, production of environmentally destructive byproducts can be prevented or remarkably reduced.

DISCLOSURE

Technical Problem

The present disclosure is directed to providing a method for producing a synthesis gas using a solid acid capable of remarkably decreasing production of air pollutants such as carbon dioxide, which includes producing hydrogen using a solid acid and producing a synthesis gas by reacting the produced hydrogen with a carbon compound.

Technical Solution

In a general aspect, there is provided a method for producing a synthesis gas including: (a) adsorbing water by reacting a solid acid mixture including a carbon compound and a solid acid with water or steam; (b) producing hydrogen by introducing the water-adsorbed solid acid mixture into a reactor and splitting the water adsorbed on the solid acid mixture; (c) producing a synthesis gas by reacting the produced hydrogen with the carbon compound in the reactor; and (d) discharging the produced synthesis gas out of the reactor.

In another general aspect, there is provided a method for producing a synthesis gas including: (e) preparing one or more water mixture selected from: a water mixture including water and a carbon compound; and a water mixture including water, a carbon compound and a solid acid; (f) producing hydrogen by introducing the water mixture into a rock formation located at the bottom of an underground bedrock reactor having a bedrock covering structure and reacting the water mixture with a solid acid included in the rock formation or with the solid acid included in the water mixture; (g) producing a synthesis gas by reacting the produced hydrogen with a carbon compound included in the rock formation or with the carbon compound included in the water mixture; and (h) discharging the produced synthesis gas out of the reactor.

In an exemplary embodiment, the method for producing a synthesis gas may further include introducing one or more material selected from a group consisting of a metal and an electrolyte into the solid acid mixture of (a) or the water mixture of (e).

In an exemplary embodiment, a compressed gas may be injected into the reactor in (b) or (c) and the produced synthesis gas may be discharged out of the reactor in (d) as mixed with the compressed gas.

In an exemplary embodiment, the compressed gas may be one or more selected from a group consisting of hydrogen, nitrogen, argon, carbon monoxide, carbon dioxide, methane and steam.

In an exemplary embodiment, the reactor or the underground bedrock reactor in (b), (c), (f) or (g) may be maintained at a temperature of 310-1400 K and at a pressure of 1 atm or higher.

In an exemplary embodiment, (a)-(d) or (e)-(h) may be repeated sequentially.

In an exemplary embodiment, the carbon compound may be one or more compound having the chemical formula $C\alpha H\beta O\gamma N\delta S\varepsilon P\eta$ (C: carbon, H: hydrogen, O: oxygen, N: nitrogen, S: sulfur, P: phosphorus, $1 \leq \alpha \leq 100$, $0 \leq \beta \leq 200$, $0 \leq \delta \leq 10$, $0 \leq \varepsilon \leq 10$, $0 \leq \eta \leq 10$).

In an exemplary embodiment, the solid acid may be one or more selected from a group consisting of igneous rock such as basalt, granite, etc., sedimentary rock such as limestone, sandstone, etc., metamorphic rock such as shale, marble, etc., zeolite, bentonite, kaolinite, attapulgite, montmorillonite, zinc oxide (ZnO), aluminum oxide ($Al_2O_3$), titanium oxide ($TiO_2$), cerium oxide ($CeO_2$), vanadium oxide ($V_2O_5$), silicon oxide ($SiO_2$), chromium oxide ($Cr_2O_3$), calcium sulfate ($CaSO_4$), manganese sulfate ($MnSO_4$), nickel sulfate ($NiSO_4$), copper sulfate ($CuSO_4$), cobalt sulfate ($CoSO_4$), cadmium sulfate ($CdSO_4$), magnesium sulfate ($MgSO_4$), iron sulfate ($FeSO_4$), aluminum sulfate ($Al_2(SO_4)_3$), calcium nitrate ($Ca(NO_3)_2$), zinc nitrate ($Zn(NO_3)_2$), iron nitrate ($Fe(NO_3)_3$), aluminum phosphate ($AlPO_4$), iron phosphate ($FePO_4$), chromium phosphate ($CrPO_4$), copper phosphate ($Cu_3(PO_4)_2$), zinc phosphate ($Zn_3(PO_4)_4$), magnesium phosphate ($Mg_3(PO_4)_2$), aluminum chloride ($AlCl_3$), titanium chloride ($TiCl_4$), calcium chloride ($CaCl_2$), calcium fluoride ($CaF_2$), barium fluoride ($BaF_2$), calcium carbonate ($CaCO_3$), magnesium carbonate ($MgCO_3$), coal, activated carbon, graphite and charcoal.

In an exemplary embodiment, the metal may be one or more selected from aluminum, zinc, iron, cobalt, manganese, chromium, nickel and titanium or an alloy thereof.

In an exemplary embodiment, the electrolyte may be one or more selected from a group consisting of sodium chloride (NaCl), potassium chloride (KCl), sodium nitrate ($NaNO_3$), potassium nitrate ($KNO_3$), sodium sulfate ($Na_2SO_4$), potassium sulfate ($K_2SO_4$), lithium carbonate ($Li_2CO_3$), sodium carbonate ($Na_2CO_3$), potassium carbonate ($K_2CO_3$), sodium dihydrogen phosphate ($NaH_2PO_4$), sodium hydrogen phosphate ($Na_2HPO_4$), sodium hydroxide (NaOH), potassium hydroxide (KOH), calcium chloride ($CaCl_2$), magnesium chloride ($MgCl_2$), calcium nitrate ($Ca(NO_3)_2$), magnesium nitrate ($Mg(NO_3)_2$), calcium sulfate ($CaSO_4$), magnesium sulfate ($MgSO_4$), calcium hydroxide ($Ca(OH)_2$), magnesium hydroxide ($Mg(OH)_2$), sulfuric acid ($H_2SO_4$), phosphoric acid ($H_3PO_4$), nitric acid ($HNO_3$) and hydrochloric acid (HCl).

In an exemplary embodiment, the solid acid, the metal and the electrolyte may be in powder form and the powder may have a particle size of 500 mesh or greater.

In an exemplary embodiment, the solid acid mixture or the water mixture in which the metal is further included may have a structure in which a metal particle is deposited in a pore of the solid acid powder and the deposited metal particle may have a diameter not greater than 10 μm.

In an exemplary embodiment, the solid acid mixture or the water mixture in which the metal is further included may have a structure in which a metal particle is coated on the surface of the solid acid powder or the solid acid powder is coated on the surface of the metal powder and the coated metal film or solid acid film may have a thickness greater than 10 nm and not greater than 10 μm.

In an exemplary embodiment, the solid acid mixture or the water mixture in which the electrolyte is further included may have a structure in which an electrolyte particle is deposited in a pore of the solid acid powder or the metal powder and the deposited electrolyte particle may have a diameter not greater than 10 μm.

In an exemplary embodiment, the solid acid mixture or the water mixture in which the electrolyte is further included may have a structure in which an electrolyte particle is coated on the surface of the solid acid powder and the metal powder or the solid acid powder is coated on the surface of the metal powder and the electrolyte powder and the coated electrolyte film or solid acid film may have a thickness greater than 10 nm and not greater than 10 μm.

In an exemplary embodiment, the solid acid mixture including the carbon compound and the solid acid may include the carbon compound in an amount greater than 0.1 wt % and smaller than 50 wt % and may include the solid acid in an amount not smaller than 50 wt % and not greater than 99.9 wt %.

In an exemplary embodiment, the solid acid mixture including the carbon compound and the solid acid and further including the metal may include the solid acid mixture of the carbon compound and the solid acid in an amount not smaller than 70 wt % and may include the metal in an amount smaller than 30 wt %.

In an exemplary embodiment, the solid acid mixture including the carbon compound and the solid acid and further including the metal and the electrolyte may include the solid acid mixture of the carbon compound and the solid acid and the metal in an amount not smaller than 80 wt % and may include the electrolyte in an amount smaller than 20 wt %.

In an exemplary embodiment, the water mixture including the water and the carbon compound may include the water in an amount not smaller than 70 wt % and not greater than 99.9 wt % and may include the carbon compound in an amount greater than 0.1 wt % and smaller than 30 wt %.

In an exemplary embodiment, the water mixture including the water, the carbon compound and the solid acid may include a mixture of the water and the carbon compound in an amount not smaller than 85 wt % and may include the solid acid in an amount smaller than 15 wt %.

In an exemplary embodiment, the water mixture including the water, the carbon compound and the solid acid and further including the metal may include a mixture of the solid acid and the metal in an amount not greater than 15 wt % and may include the metal in an amount not greater than 5 wt %.

In an exemplary embodiment, the water mixture including the water, the carbon compound and the solid acid and further including the metal and the electrolyte may include a mixture of the solid acid, the metal and the electrolyte in an amount not greater than 15 wt %, may include the metal in an amount not greater than 5 wt % and include the electrolyte in an amount not greater than 3 wt %.

In an exemplary embodiment, the reactor may be a multi-walled reactor including 70% or more of iron and may be made of one or more material selected from a group consisting of SUS steel, carbon steel, a mixture of SUS steel and carbon steel, concrete, iron-reinforced concrete and a steel.

In an exemplary embodiment, the underground bedrock reactor may include a dense natural bedrock layer through which methane cannot pass and the rock formation at the bottom of the underground bedrock reactor may be made of porous rock having a porosity of 0.01 vol % or greater.

Advantageous Effects

A method for producing a synthesis gas using a solid acid according to the present disclosure allows continuous production of a synthesis gas which is similar to natural gas by producing hydrogen from reaction of a solid acid with water and reacting the produced hydrogen with a carbon compound. The method also greatly reduces the production of environmental pollutants such as carbon dioxide.

| [Description of reference numerals used in the drawings] | |
|---|---|
| 1: reactor | 2: heater |
| 3: cooler | 4: cooling water inlet |
| 5: cooling water outlet | 6: compressed gas inlet |
| 7: solid acid inlet | 8: thermometer tube |
| 9: gas outlet | 10: pressure-resistant gasket |
| 11: joint of upper and lower portions of reactor | |
| 12: water mixture inlet | 13: gas outlet |
| 14: water mixture inlet closing device | 15: gas discharge tube |

MODE FOR INVENTION

Hereinafter, the present disclosure is described in further detail.

A method for producing a synthesis gas using a solid acid according to an exemplary embodiment of the present disclosure includes: (a) sufficiently adsorbing water by reacting a solid acid mixture including a carbon compound and a solid acid with water or steam; (b) producing hydrogen by introducing the water-adsorbed solid acid mixture into a reactor until it occupies about 50% of the internal space of the reactor and splitting the water adsorbed on the solid acid mixture; (c) producing a synthesis gas by reacting the produced hydrogen with the carbon compound in the reactor; and (d) discharging the produced synthesis gas out of the reactor.

A method for producing a synthesis gas using a solid acid according to another exemplary embodiment of the present disclosure includes: (e) preparing one or more water mixture selected from: a water mixture including water and a carbon compound; and a water mixture including water, a carbon compound and a solid acid; (f) producing hydrogen by introducing the water mixture into a rock formation located at the bottom of an underground bedrock reactor having a bedrock covering structure and reacting the water mixture with a solid acid included in the rock formation or with the solid acid included in the water mixture; (g) producing a synthesis gas by reacting the produced hydrogen with a carbon compound included in the rock formation or with the carbon compound included in the water mixture; and (h) discharging the produced synthesis gas out of the reactor.

The solid acid mixture of (a) or the water mixture of (e) may further include one or more material selected from a group consisting of a metal and an electrolyte.

The solid acid may be one or more selected from a group consisting of igneous rock such as basalt, granite, etc., sedimentary rock such as limestone, sandstone, etc., metamorphic rock such as shale, marble, etc., zeolite, bentonite, kaolinite, attapulgite, montmorillonite, zinc oxide (ZnO), aluminum oxide ($Al_2O_3$), titanium oxide ($TiO_2$), cerium oxide ($CeO_2$), vanadium oxide ($V_2O_5$), silicon oxide ($SiO_2$), chromium oxide ($Cr_2O_3$), calcium sulfate ($CaSO_4$), manganese sulfate ($MnSO_4$), nickel sulfate ($NiSO_4$), copper sulfate ($CuSO_4$), cobalt sulfate ($CoSO_4$), cadmium sulfate ($CdSO_4$), magnesium sulfate ($MgSO_4$), iron sulfate ($FeSO_4$), aluminum sulfate ($Al_2(SO_4)_3$), calcium nitrate ($Ca(NO_3)_2$), zinc nitrate ($Zn(NO_3)_2$), iron nitrate ($Fe(NO_3)_3$), aluminum phosphate ($AlPO_4$), iron phosphate ($FePO_4$), chromium phosphate ($CrPO_4$), copper phosphate ($Cu_3(PO_4)_2$), zinc phosphate ($Zn_3(PO_4)_4$), magnesium phosphate ($Mg_3(PO_4)_2$), aluminum chloride ($AlCl_3$), titanium chloride ($TiCl_4$), calcium chloride ($CaCl_2$), calcium fluoride ($CaF_2$), barium fluoride ($BaF_2$), calcium carbonate ($CaCO_3$), magnesium carbonate ($MgCO_3$), coal, activated carbon, graphite and charcoal.

The carbon compound may be one or more compound having the chemical formula $C\alpha H\beta O\gamma N\delta S\varepsilon P\eta$ (C: carbon, H: hydrogen, O: oxygen, N: nitrogen, S: sulfur, P: phosphorus, $1 \leq \alpha \leq 100$, $0 \leq \beta \leq 200$, $0 \leq \gamma \leq 100$, $0 \leq \delta \leq 10$, $0 \leq \varepsilon \leq 10$, $0 \leq \eta \leq 10$). For example, the carbon compound may be one or more compound selected from carbon monoxide, carbon dioxide, methanol, ethanol, propanol, butanol, pentanol, pentanol, kerosene, light oil, coal, activated carbon, graphite, charcoal, an animal, a plant, a microorganism, etc.

The solid acid mixture including the solid acid and the carbon compound may include the solid acid in an amount not smaller than 50 wt % and not greater than 99.9 wt % and may include the carbon compound in an amount greater than 0.1 wt % and smaller than 50 wt %. If the solid acid mixture includes the solid acid in an amount not smaller than 99.9 wt %, the production of the synthesis gas decreases remarkably. More specifically, the solid acid may be included in an amount of 80-95 wt % to improve the yield of the synthesis gas.

Scheme 1 schematically illustrates water splitting using a solid acid. Referring to Scheme 1, water is adsorbed at the Lewis acid site of the solid acid by coordination, resulting in the formation of a Bronsted acid site. The Bronsted acid site is hydrogen-bonded to the oxygen of the solid acid. As a result, the water is adsorbed as doubly bonded to the solid acid via coordination and hydrogen bonding. If the solid acid wherein the water is adsorbed by the double bonding is heated, electrons are exchanged through the two bonds. As a result, the adsorbed water is electrolyzed and split into hydrogen and a hydroxyl radical.

[Scheme 1]

The efficiency of this water splitting reaction can be maximized when the water is adsorbed to the solid acid in gas or liquid state, especially in liquid state.

In (b) and (c), if the temperature at the bottom of a reactor 1 is maintained at 310-1400 K, hydrogen and a synthesis gas are produced continuously for a long time inside the reactor. In order to ensure better adsorption of the water to the solid acid, the temperature at the top of the reactor may be maintained as desired by continuously supplying water to a cooler equipped at the top of the reactor. In (d), the hydrogen and the synthesis gas produced inside the reactor may be discharged out of the reactor through an outlet after a predetermined time.

A compressed gas may be injected into the reactor in (b) or (c) and the produced synthesis gas may be discharged out of the reactor in (d) as mixed with the compressed gas. The compressed gas may be introduced into the reactor 1 from a compressed gas supply container via a gas outlet 9. The compressed gas may be one or more selected from a group consisting of hydrogen, nitrogen, argon, carbon monoxide, carbon dioxide, methane and steam.

The solid acid mixture including the solid acid and the carbon compound may be mixed with a metal. The metal may be one or more selected from aluminum, zinc, iron, cobalt, manganese, chromium, nickel and titanium or an alloy thereof. The metal may enhance the efficiency of water splitting even at a low reaction temperature of 1000 K or lower. It is because the metal facilitates the motion of electrons as they move from the solid acid to the proton of the water.

Specifically, the solid acid and the metal may be in powder form. The solid acid and the metal in powder form may have a particle size of 0.1 nm or greater. Reaction efficiency increases as the particle size of the solid acid and the metal powder is smaller because the surface area increases. However, if the particle size is smaller than 0.1 nm, economic efficiency decreases remarkably. Accordingly, the solid acid powder and the metal powder may have a particle size of 0.1 nm or greater.

The solid acid mixture including the solid acid, the carbon compound and the metal may have a structure in which a metal particle is deposited in a pore of the solid acid powder. In this case, since reaction efficiency increases as the particle size of the metal particle size is smaller, the metal particle may have a diameter not greater than 10 µm.

The solid acid mixture in (b) and (c) in which the metal is further mixed with a mixture of the carbon compound and the solid acid may have a structure in which a metal particle is coated on the surface of the solid acid powder or the solid acid powder is coated on the surface of the metal powder and the coated metal film or solid acid film may have a thickness greater than 10 nm and not greater than 10 µm. If the thickness of the metal film or solid acid film is not greater than 10 nm, it is difficult to obtain a uniform film. And, if the thickness is greater than 10 µm, reaction efficiency decreases. More specifically, the best water splitting efficiency may be achieved when the metal film or solid acid film has a thickness of 50 nm to 2 µm.

The solid acid mixture in (b) and (c) which includes the carbon compound and the solid acid and further includes the metal may include the carbon compound and the solid acid in an amount not smaller than 70 wt % and may include the metal in an amount not greater than 30 wt %. If the metal powder is included an amount greater than 30 wt %, the effect of water splitting by the solid acid decreases remarkably because the reaction occurs predominantly between the metal powder and the water. More specifically, the best effect can be achieved when the content of the metal powder is maintained to be not greater than 10 wt %.

The mixture of the metal, the carbon compound and the solid acid in (b) and (c) may further include an electrolyte. In this case, the electrolyte may provide improved water splitting efficiency. It is because the movement of the electrons on the surface of the solid acid is facilitated by the electrolyte when they move toward the proton of the water.

The electrolyte may be one or more selected from a group consisting of sodium chloride (NaCl), potassium chloride (KCl), sodium nitrate ($NaNO_3$), potassium nitrate ($KNO_3$), sodium sulfate ($Na_2SO_4$), potassium sulfate ($K_2SO_4$), lithium carbonate ($Li_2CO_3$), sodium carbonate ($Na_2CO_3$), potassium carbonate ($K_2CO_3$), sodium dihydrogen phosphate ($NaH_2PO_4$), sodium hydrogen phosphate ($Na_2HPO_4$), sodium hydroxide (NaOH), potassium hydroxide (KOH), calcium chloride ($CaCl_2$), magnesium chloride ($MgCl_2$), calcium nitrate ($Ca(NO_3)_2$), magnesium nitrate ($Mg(NO_3)_2$), calcium sulfate ($CaSO_4$), magnesium sulfate ($MgSO_4$), calcium hydroxide ($Ca(OH)_2$), magnesium hydroxide ($Mg(OH)_2$), sulfuric acid ($H_2SO_4$), phosphoric acid ($H_3PO_4$), nitric acid ($HNO_3$) and hydrochloric acid (HCl).

The solid acid, the metal and the electrolyte used in (b) and (c) may be in powder form and the particle size may be 0.1 nm or greater. Reaction efficiency increases as the solid acid powder, the metal powder and the electrolyte powder is smaller because the surface area increases. However, if the particle size is smaller than 0.1 nm, economic efficiency may decrease remarkably. Accordingly, the solid acid powder, the metal powder and the electrolyte powder may have a particle size of 0.1 nm or greater.

The solid acid mixture in (b) and (c) which includes the electrolyte, the metal, the carbon compound and the solid acid may have a structure in which an electrolyte particle is deposited in a pore of the solid acid powder or the metal powder. Since reaction efficiency increases as the size of the electrolyte particle is smaller, the electrolyte particle deposited in the pore of the solid acid powder or the metal powder may have a diameter not greater than 10 µm.

The solid acid mixture in (b) and (c) which includes the electrolyte, the metal, the carbon compound and the solid acid may have a structure in which an electrolyte powder is coated on the surface of the solid acid and metal powder or a solid acid powder is coated on the surface of the metal and electrolyte powder. The coated electrolyte film or solid acid film may have a thickness greater than 10 nm and not greater than 10 µm. If the thickness of the electrolyte film or solid acid film is not greater than 10 nm, it is difficult to form a uniform film. And, if it is greater than 10 µm, reaction efficiency decreases. More specifically, the electrolyte film or solid acid film may have a thickness from 50 nm to 2 µm to obtain the best water splitting efficiency.

The solid acid mixture in (b) and (c) which includes the electrolyte, the metal, the carbon compound and the solid acid may include the metal, the carbon compound and the solid acid mixture in an amount not smaller than 80 wt % and may include the electrolyte in an amount not greater than 20 wt %. If the electrolyte powder is included in an amount greater than 20 wt %, the effect of water splitting by the solid acid may decrease since the electrolyte inhibits the movement of electrons. More specifically, the content of the electrolyte powder may be maintained not greater than 10 wt % to obtain the best efficiency.

When a natural bedrock layer and porous rock are used, i.e. when an underground bedrock reactor is used, the water mixture in (e) which includes the water and the carbon compound may include the water in an amount not smaller than 70 wt % and not greater than 99.9 wt % and may include the carbon compound in an amount greater than 0.1 wt % and smaller than 30 wt %. If the water is included in an amount smaller than 70 wt %, the transfer speed of the water mixture decreases remarkably. And, if the water is included in an amount of 99.9 wt % or greater, the production of a synthesis gas in the porous rock mixture decreases remarkably. More specifically, the water may be included in an amount from 90 wt % to 98 wt % to obtain the best transfer efficiency and synthesis gas production efficiency.

In (e), the water mixture including the carbon compound and the water may further include the solid acid. In this case, the mixture of the carbon compound and the water may be included in an amount not smaller than 85 wt % and the solid acid may be included in an amount not greater than 15 wt %. If the amount of the solid acid is 15 wt % or greater, transfer efficiency decreases remarkably. More specifically, the solid acid may be included in an amount not greater than 7 wt % to obtain the best transfer efficiency.

In (e), the water mixture including the solid acid, the carbon compound and the water may further include the metal. In this case, water splitting efficiency may be improved even at a low reaction temperature of 1000 K or below due to the metal. This is because the metal facilitates the motion of electrons as they move from the solid acid to the proton of the water. The metal may be one or more selected from aluminum, zinc, iron, cobalt, manganese, chromium, nickel and titanium or an alloy thereof. The water mixture may have a structure in which a metal particle is deposited in a pore of the solid acid powder and the deposited metal particle may have a diameter not greater than 10 μm.

The water mixture in (e) which includes the metal, the solid acid, the carbon compound and the water may have a structure in which a metal powder is coated on the surface of the solid acid powder or the solid acid mixture powder is coated on the surface of the metal powder. The coated metal film or solid acid film may have a thickness greater than 10 nm and not greater than 10 μm.

The water mixture in (e) which includes the metal, the solid acid, the carbon compound and the water may include the metal and the solid acid in an amount not greater than 15 wt % and may include the metal in an amount not greater than 5 wt %.

The water mixture in (e) which includes the metal, the solid acid, the carbon compound and the water may further include an electrolyte. In this case, an electrolyte particle may be deposited in a pore of the solid acid or the metal.

The water mixture in (e) which includes the electrolyte, the metal and the solid acid mixed with the carbon compound and the water may have a structure in which an electrolyte powder is coated on the surface of the solid acid or metal powder or a solid acid powder is coated on the surface of the metal or electrolyte powder.

The water mixture in (e) which includes the electrolyte, the metal and the solid acid mixed with the carbon compound and the water may include the electrolyte, the solid acid and the metal mixture in an amount not greater than 15 wt %, may include the metal in an amount not greater than 5 wt % and may include the electrolyte in an amount not greater than 3 wt %.

In (e), each of the electrolyte, the metal and the solid acid may be in powder and may have a particle size of 0.1 nm or greater. Reaction efficiency increases as the particle size is smaller since the surface area increases as the electrolyte, metal and solid acid powder has a smaller particle size. However, if the particle size is smaller than 0.1 nm, economic efficiency may decrease remarkably. Accordingly, the electrolyte, the metal and the solid acid may have a particle size of 0.1 nm or greater.

The reactor in (b) and (c) may include 70% or more of iron and may be made of one or more material selected from a group consisting of SUS steel, carbon steel, a mixture of SUS steel and carbon steel, concrete, iron-reinforced concrete and a steel.

In the production of a synthesis gas according to present disclosure, the rate at which the hydrogen is produced is very important. It is because, since the concentration of the carbon compound in the reactor is constant, the rate at which the synthesis gas is produced is proportional to the rate at which the hydrogen is produced. Accordingly, it can be said that the rate at which the hydrogen and the synthesis gas are produced is proportional to the rate of water splitting.

During the water splitting reaction according to the present disclosure, the reaction temperature inside the reactor may be maintained at 310-1400 K and the reaction pressure may be maintained at 1 atm or higher in favor of reaction efficiency and economic efficiency.

Although the water splitting can occur if the reaction temperature is 273 K or higher, the water splitting efficiency is low at temperatures below 310 K. And, although the water splitting efficiency increases as the reaction temperature is higher, the increase of efficiency decreases greatly at temperatures above 1400 K. Accordingly, the reaction temperature may be maintained at 310-1400 K.

During the water splitting reaction by the solid acid, the amount of water adsorbed to the solid acid increases as the reaction pressure is higher. Consequently, the production of hydrogen increases as the reaction pressure is higher. If the reaction pressure exceeds 220 atm, the water splitting efficiency decreases temporarily because water is in the supercritical state. However, since the water splitting efficiency increases with pressure even in the supercritical state, the production of the synthesis gas increases as the reaction pressure is higher. Further, since the water splitting efficiency increases as the reaction pressure is lower and energy is required to maintain to reduce the pressure, if the reaction pressure is maintained below 1 atm, the economic efficiency of synthesis gas production decreases greatly. Accordingly, the reaction pressure during the water splitting may be maintained at 1 atm or higher.

In the production of the synthesis gas by water splitting in (a)-(d) according to the present disclosure, a reactor made of a heat- and pressure-resistant material is used. Since the reactor is maintained at a temperature of 310-1400 K and a pressure of 1 atm or higher during the water splitting reaction, the reactor is made of a heat- and pressure-resistant material such that the reaction can occur stably in the temperature and pressure ranges. The heat- and pressure-resistant material may include 70% or more of iron and may be, for example, SUS steel, carbon steel, a mixture thereof, concrete or iron-reinforced concrete. If the reactor is made of a material other than steel or concrete, the reactor may corrode or affect chemical reactions under high temperature and pressure because of low melting point. If the reactor includes 70% or more of iron, whose melting point is above 1700 K, or is made of concrete, the reactor does not affect reactions even under high temperature and pressure.

Hereinafter, the present disclosure will be described in detail through examples. However, the following examples are for illustrative purposes only and it will be apparent to those of ordinary skill in the art that the scope of the present disclosure is not limited by the examples.

[Experimental Apparatus]

Figure 1:
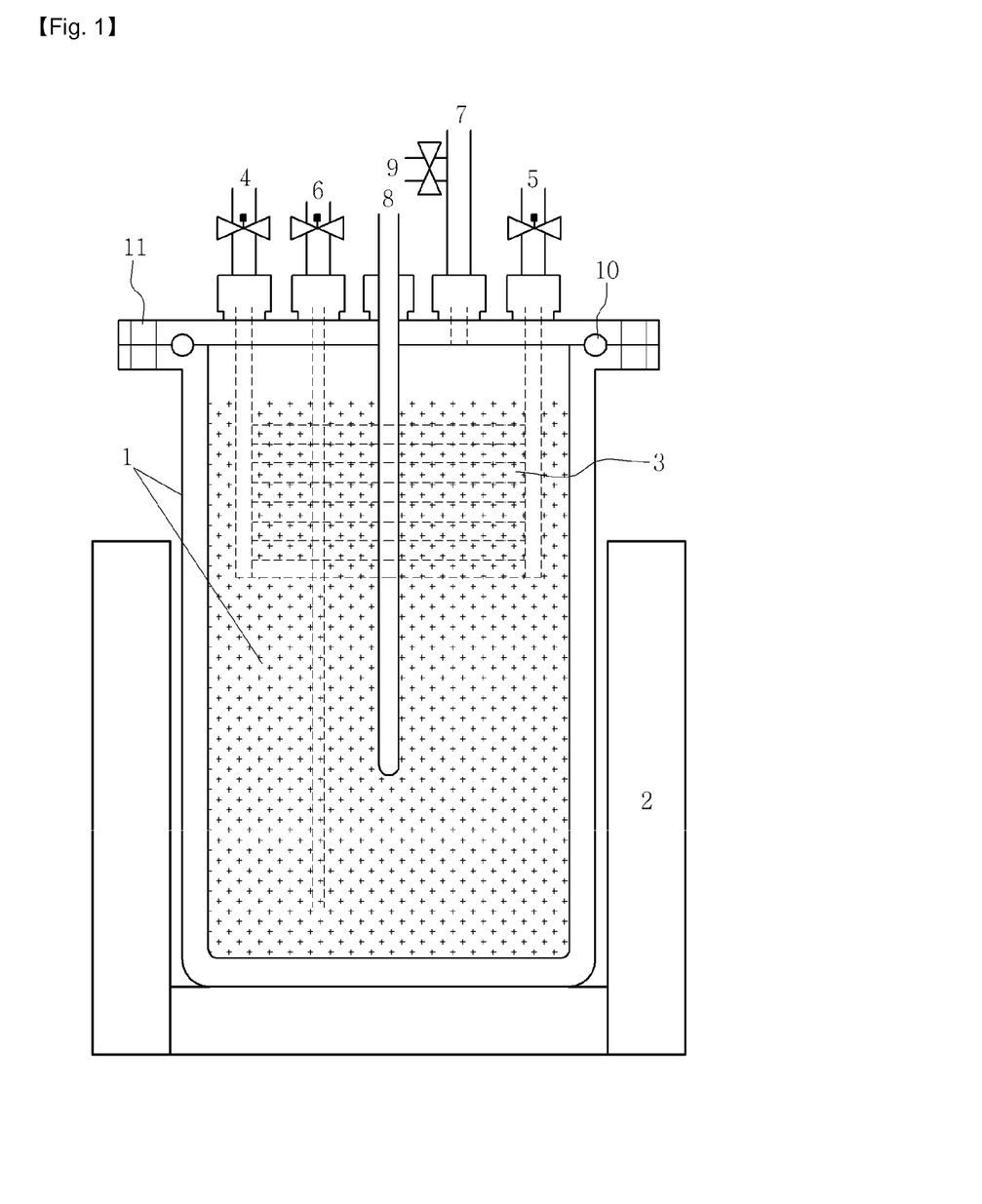
FIG. 1 schematically shows a reactor for producing hydrogen and producing a synthesis gas through steps (a)-(d) according to an exemplary embodiment of the present disclosure.
Figure 2:
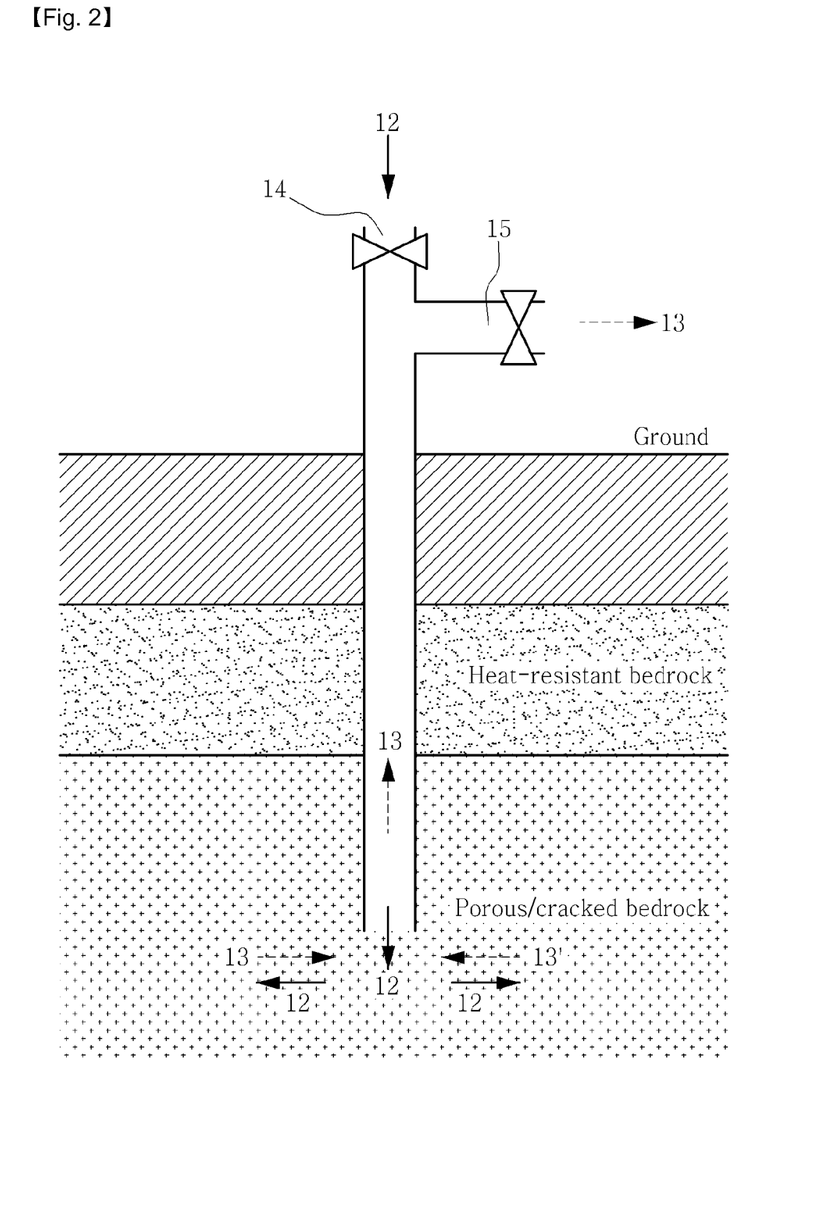
FIG. 2 schematically shows an underground bedrock reactor for producing hydrogen and producing a synthesis gas through steps (e)-(h) according to an exemplary embodiment of the present disclosure.

FIG. 1 schematically shows an experimental apparatus for water splitting used in the following experiments.

Referring to FIG. 1, the water-adsorbed solid acid mixture is supplied dropwise into a reactor 1 made of a heat- and pressure-resistant material such as SUS steel, concrete, etc. through a solid acid inlet 7. After the supply of the water-adsorbed solid acid mixture is completed, the solid acid inlet is closed. A heater 2 such as a heating wire is equipped outside the reactor to maintain the temperature inside the reactor 1 at 310 K or higher. Further, a cooler 3 is equipped at an upper portion inside the reactor so that steam produced from heating and reaction can be liquefied and then adsorbed again to the solid acid. After a compressed gas for increasing the pressure inside the reactor is injected into the reactor through a compressed gas inlet 6, the compressed gas inlet 6 is closed by operating a valve.

Consequently, the water-adsorbed solid acid supplied into the reactor 1 continuously produces hydrogen by splitting water inside the reactor which is maintained at 310 K or higher. The produced hydrogen continuously produces a synthesis gas by reacting with a carbon compound supplied into the reactor 1.

Desired amounts of the hydrogen and the synthesis gas produced inside the reactor may be discharged out of the reactor by operating a valve of a synthesis gas outlet 9 after a desired time.

The concentration of the synthesis gas discharged from the reactor 1 is measured by gas chromatography.

While injecting argon gas through a compressed gas inlet 6 at a rate of 100 mL/min, air inside the reactor was expelled by flowing argon gas into the reactor for 20 hours with a synthesis gas outlet 9 open. Then, after closing the outlet, the compressed gas inlet 6 was closed when the pressure inside the reactor reached 100 atm.

The reactor was heated by a heater 2 equipped outside thereof. With the temperature at a lower portion inside the reactor maintained at 423 K, a cooling water inlet 4 and a cooling water outlet 5 provided at the top of the reactor were opened and the temperature at an upper portion inside the reactor was maintained at 323 K by supplying an adequate amount of cooling water to a cooler 3 equipped at the top upper portion inside the reactor. The reactor was maintained at a pressure of around 150 atm.

Inside the reactor 1, hydrogen produced from water splitting by the solid acid reacts with graphite to produce a synthesis gas. With 10-day intervals, about 10 mL of the gas inside the reactor was discharged through the synthesis gas outlet 9 and the volume percentages of hydrogen, methane gas and total organic compounds in the gas were measured by gas chromatography. The result is given in Table 1. The time described in Table 1 means the period from when the water-adsorbed solid acid mixture was introduced into the reactor and the temperature at the lower portion and upper portion inside the reactor reached 423 K and 323 K, respectively.

TABLE 1

| | | Concentration (ppm) | | | | | |
| | | 10 days | | | 20 days | | |
| Examples | Compounds | Hydrogen | Methane | Total organic compounds | Hydrogen | Methane | Total organic compounds |
|---|---|---|---|---|---|---|---|
| 1 | Bentonite | 250 | 370 | 490 | 480 | 780 | 870 |
| 2 | Alumina | 330 | 600 | 950 | 980 | 1580 | 1750 |
| 3 | Silica | 170 | 380 | 700 | 750 | 1250 | 1330 |
| 4 | Zinc oxide | 250 | 400 | 500 | 490 | 820 | 920 |
| 5 | Titanium oxide | 360 | 550 | 600 | 580 | 980 | 1150 |
| 6 | Shale | 450 | 620 | 750 | 720 | 1530 | 1700 |
| 7 | Limestone | 320 | 410 | 480 | 480 | 1030 | 1130 |
| 8 | Granite | 230 | 270 | 400 | 450 | 850 | 970 |
| 9 | Basalt | 380 | 450 | 600 | 550 | 1200 | 1350 |

[Experiment 1: Production of Hydrogen and Synthesis Gas Using Different Solid Acids]

Water splitting was carried out using a reactor 1 (internal volume: 7800 mL) shown in FIG. 1 with different solid acids.

The solid acids described in Table 1 were pulverized to an average size of about 0.2 mm. 97 wt % of the resulting solid acid powder was mixed with 3 wt % of graphite powder having an average size of 0.1 mm and 10 wt % of water was adsorbed on 90 wt % of the mixture. The water-adsorbed mixture was introduced into the reactor 1 up to 98 vol % of the internal volume of the reactor through a solid acid inlet 7 and the solid acid inlet was closed.

As seen from Table 1, all the solid acids used in the experiment produced a considerable amount of hydrogen and a synthesis gas (methane) by splitting water although the amount differed.

[Comparative Experiment 1: Effect of Addition of Carbon Compound]

Experiment was carried out in the same manner and under the same condition as Experiment 1 using basalt as a solid acid material without addition of a carbon compound. The production amount of hydrogen and a synthesis gas was compared in Table 2.

TABLE 2

| | Concentration (ppm) | | | | | |
|---|---|---|---|---|---|---|
| | 10 days | | | 20 days | | |
| | Hydrogen | Methane | Total organic compounds | Hydrogen | Methane | Total organic compounds |
| Example 9 | 380 | 450 | 600 | 550 | 1200 | 1350 |
| Comparative Example 1 | 2500 | 55 | 76 | 4200 | 92 | 130 |

As seen from Table 2, although hydrogen could be produced through water splitting using only the solid acid and water when no carbon compound was added, the production of the synthesis gas (methane) from the reaction of the produced hydrogen with a carbon compound decreased remarkably. Although a small amount of the synthesis gas was produced, it was a product of the reaction of hydrogen with a carbon compound included in the solid acid as impurity.

[Experiment 2: Production of Hydrogen and Synthesis Gas Depending on Temperature]

The effect of reaction temperature was investigated using shale as a solid acid. In the same manner and under the same condition as Experiment 1, the temperature at the lower portion inside the reactor 1 (internal volume 7800 mL) was maintained at the temperature described in Table 3 using a heater 2 equipped outside the reactor, while maintaining the temperature at the upper portion inside the reactor at 323 K by using a cooler 3 equipped at the upper portion inside the reactor. The pressure inside the reactor was maintained at 150 atm by controlling the amount of argon gas injected into the reactor. The volume percentages of hydrogen, methane gas and total organic compounds in the gas discharged from the reactor 1 were measured by gas chromatography. The result is given in Table 3.

TABLE 3

| | | Concentration (ppm) | | | | | |
|---|---|---|---|---|---|---|---|
| | | 10 days | | | 20 days | | |
| Examples | Reaction temperature (K) | Hydrogen | Methane | Total organic compounds | Hydrogen | Methane | Total organic compounds |
| 10 | 348 | 40 | 6 | 10 | 90 | 13 | 21 |
| 11 | 373 | 160 | 250 | 320 | 380 | 430 | 550 |
| 6 | 423 | 450 | 620 | 750 | 720 | 1530 | 1700 |
| 12 | 473 | 750 | 1350 | 1700 | 850 | 2200 | 2500 |
| 13 | 573 | 900 | 2700 | 3200 | 1100 | 3400 | 3700 |
| 14 | 673 | 2100 | 5300 | 5800 | 3200 | 8700 | 9300 |

As seen from Table 3, the production of the synthesis gas increased as the temperature at the lower portion inside the reactor 1 was higher.

[Experiment 3: Production of Hydrogen and Synthesis Gas Depending on Reaction Pressure]

The effect of reaction pressure on the water splitting reaction was investigated using aluminum oxide as a solid acid. In the same manner and under the same condition as Experiment 1, the temperature at the lower portion inside the reactor 1 (internal volume 7800 mL) was maintained at 673 K using a heater 2 equipped outside the reactor, while maintaining the temperature at the upper portion inside the reactor at 353 K by using a cooler 3 equipped at the upper portion inside the reactor. The pressure inside the reactor was maintained at the pressure described in Table 4 by controlling the amount of argon gas injected into the reactor. The volume percentages of hydrogen, methane gas and total organic compounds in the gas discharged from the reactor 1 were measured by gas chromatography. The result is given in Table 4.

TABLE 4

| | Reaction | Concentration (ppm) | | | | | |
|---|---|---|---|---|---|---|---|
| | | 10 days | | | 20 days | | |
| Examples | pressure (atm) | Hydrogen | Methane | Total organic compounds | Hydrogen | Methane | Total organic compounds |
| 15 | 50 | 400 | 45 | 60 | 900 | 130 | 210 |
| 16 | 100 | 1600 | 150 | 190 | 2800 | 270 | 320 |
| 17 | 150 | 3000 | 620 | 750 | 4200 | 1130 | 1200 |
| 18 | 200 | 4500 | 1350 | 1700 | 5500 | 2200 | 2500 |
| 19 | 250 | 3500 | 1200 | 1400 | 9000 | 1900 | 2200 |

As seen from Table 4, the concentration of hydrogen and the synthesis gas increased with the reaction pressure up to 200 atm. But, at 250 atm, which is higher than the critical pressure of water (220 atm), concentration of hydrogen and the synthesis gas decreased as compared to 200 atm.

[Experiment 4: Effect of Mixing Solid Acid with Metal]

The effect of mixing granite as a solid acid with 5 wt % of various metal powders was investigated. In the same manner and under the same condition as Experiment 1, the temperature at the lower portion inside the reactor 1 (internal volume 7800 mL) was maintained at 573 K using a heater 2 equipped outside the reactor, while maintaining the temperature at the upper portion inside the reactor at 353 K by using a cooler 3 equipped at the upper portion inside the reactor. The pressure inside the reactor was maintained 150 atm by controlling the amount of argon gas injected into the reactor. The volume percentages of hydrogen, methane gas and total organic compounds in the gas discharged from the reactor 1 were measured by gas chromatography. The result is given in Table 5.

TABLE 5

| | | Concentration (ppm) | | | | | |
|---|---|---|---|---|---|---|---|
| | | 10 days | | | 20 days | | |
| Examples | Metals | Hydrogen | Methane | Total organic compounds | Hydrogen | Methane | Total organic compounds |
| 20 | Aluminum | 4000 | 450 | 60 | 9000 | 1300 | 1500 |
| 21 | Zinc | 8000 | 750 | 930 | 18000 | 2700 | 3000 |
| 22 | Iron | 15000 | 920 | 1050 | 24000 | 2100 | 2400 |
| 23 | Cobalt | 22000 | 1350 | 1700 | 35000 | 3200 | 3500 |
| 24 | Nickel | 17000 | 1200 | 1400 | 29000 | 2900 | 3200 |
| 25 | Manganese | 11000 | 630 | 750 | 22000 | 1300 | 1600 |

As seen from Table 5, when the solid acid was mixed with the metal, all the contents of hydrogen, methane gas and total organic compounds in the discharged gas increased. Especially, the increase in the production of hydrogen was remarkable.

[Experiment 5: Effect of Addition Amount of Metal]

The effect of mixing granite as a solid acid with 5-20 wt % of iron powder was investigated. In the same manner and under the same condition as Experiment 1, the temperature at the lower portion inside the reactor 1 (internal volume 7800 mL) was maintained at 573 K using a heater 2 equipped outside the reactor, while maintaining the temperature at the upper portion inside the reactor at 353 K by using a cooler 3 equipped at the upper portion inside the reactor. The pressure inside the reactor was maintained 150 atm by controlling the amount of argon gas injected into the reactor. The volume percentages of hydrogen, methane gas and total organic compounds in the gas discharged from the reactor 1 were measured by gas chromatography. The result is given in Table 6.

TABLE 6

| | | Concentration (ppm) | | | | | |
|---|---|---|---|---|---|---|---|
| | | 10 days | | | 20 days | | |
| Examples | Iron content (wt %) | Hydrogen | Methane | Total organic compounds | Hydrogen | Methane | Total organic compounds |
| 22 | 5 | 15000 | 920 | 1050 | 24000 | 2100 | 2400 |
| 26 | 10 | 25000 | 1600 | 2100 | 38000 | 3300 | 4100 |
| 27 | 15 | 33000 | 2300 | 3000 | 49000 | 4200 | 5100 |
| 28 | 20 | 36000 | 2500 | 3200 | 51000 | 4400 | 5300 |

As seen from Table 6, when the solid acid was mixed with the metal, the contents of hydrogen, methane gas and total organic compounds in the discharged gas increased with the mixing amount of the metal. But, the degree of increase of the contents of hydrogen, methane gas and total organic compounds in the discharged gas decreased as the mixing amount of the metal increased.

[Experiment 6: Effect of Coating Solid Acid with Metal]

100-mesh iron powder was coated on zinc oxide as a solid acid with various thicknesses and experiment was performed in the same manner and under the same condition as Experiment 5. The result is given in Table 7.

TABLE 7

| | | Concentration (ppm) | | | | | |
|---|---|---|---|---|---|---|---|
| | | 10 days | | | 20 days | | |
| Examples | Iron film thickness (nm) | Hydrogen | Methane | Total organic compounds | Hydrogen | Methane | Total organic compounds |
| 29 | 100 | 5000 | 820 | 950 | 24000 | 2000 | 2400 |
| 30 | 500 | 15000 | 1800 | 2300 | 38000 | 3300 | 3900 |
| 31 | 1000 | 17000 | 2000 | 2500 | 28000 | 4100 | 4400 |
| 32 | 5000 | 26000 | 1500 | 1900 | 51000 | 3400 | 3800 |

As seen from Table 7, the contents of hydrogen, methane gas and total organic compounds in the discharged gas increased with the mixing amount of the metal until the thickness of the iron film was 1000 nm. But, when the thickness of the iron film was 5000 nm, the contents of hydrogen, methane gas and total organic compounds in the discharged gas decreased as compared to when the iron film thickness was 1000 nm.

[Experiment 7: Effect of Using Mixture of Solid Acid and Electrolyte]

The effect of mixing shale as a solid acid with 5 wt % of various electrolyte powders was investigated. In the same manner and under the same condition as Experiment 1, the temperature at the lower portion inside the reactor 1 (internal volume 7800 mL) was maintained at 573 K using a heater 2 equipped outside the reactor, while maintaining the temperature at the upper portion inside the reactor at 353 K by using a cooler 3 equipped at the upper portion inside the reactor. The pressure inside the reactor was maintained 150 atm by controlling the amount of argon gas injected into the reactor. The volume percentages of hydrogen, methane gas and total organic compounds in the gas discharged from the reactor 1 were measured by gas chromatography. The result is given in Table 8.

TABLE 8

| | | Concentration (ppm) | | | | | |
|---|---|---|---|---|---|---|---|
| | | 10 days | | | 20 days | | |
| Examples | Electrolytes | Hydrogen | Methane | Total organic compounds | Hydrogen | Methane | Total organic compounds |
| 33 | K$_2$SO$_4$ | 2000 | 820 | 950 | 4200 | 2000 | 2400 |
| 34 | Li$_2$CO$_3$ | 3000 | 1800 | 2300 | 7800 | 3300 | 3900 |
| 35 | MgCl$_2$ | 1700 | 2000 | 2500 | 2800 | 4100 | 4400 |
| 36 | Ca(OH)$_2$ | 2600 | 1500 | 1900 | 5100 | 3400 | 3800 |

As seen from Table 8, when water splitting was performed using a mixture of shale and the electrolyte powder, the volume percentages of hydrogen, methane gas and organic compound in the discharged gas increased as compared to when only the solid acid was used.

[Experiment 8: Effect of Addition Amount of Electrolyte]

100-mesh alumina as a solid acid was mixed with 5-20 wt % of 100-mesh potassium sulfate (K$_2$SO$_4$) powder and experiment was carried out in the same manner and under the same condition as Experiment 7. The volume percentages of hydrogen, methane gas and total organic compounds in the gas discharged from the reactor 1 were measured by gas chromatography. The result is given in Table 9.

TABLE 9

| | | Concentration (ppm) | | | | | |
|---|---|---|---|---|---|---|---|
| | | 10 days | | | 20 days | | |
| Examples | Potassium sulfate content (wt %) | Hydrogen | Methane | Total organic compounds | Hydrogen | Methane | Total organic compounds |
| 37 | 5 | 12000 | 820 | 1050 | 18000 | 2100 | 2500 |
| 38 | 10 | 22000 | 1400 | 1700 | 32000 | 2900 | 3400 |
| 39 | 15 | 30000 | 1800 | 2200 | 43000 | 3600 | 4200 |
| 40 | 20 | 33000 | 1900 | 2300 | 47000 | 3900 | 4500 |

As seen from Table 9, the volume percentages of hydrogen, methane gas and total organic compounds in the gas discharged from the reactor 1 were higher when the potassium sulfate powder was added than when only the solid acid was used. However, the degree of increase of the volume percentages of hydrogen, methane gas and total organic compounds in the discharged gas decreased as the addition amount of the potassium sulfate powder increased.

[Experiment 9: Effect of Deposition of Electrolyte in Solid Acid and Metal Mixture]

100-mesh limestone as a solid acid was mixed with 20 wt % of 100-mesh iron powder. Then, KOH was deposited in the mixture from 5 wt % to 20 wt % with 5-wt % increments and experiment was carried out in the same manner and under the same condition as Experiment 7. The result is given in Table 10.

TABLE 10

| | | Concentration (ppm) | | | | | |
|---|---|---|---|---|---|---|---|
| | | 10 days | | | 20 days | | |
| Examples | KOH content (wt %) | Hydrogen | Methane | Total organic compounds | Hydrogen | Methane | Total organic compounds |
| 41 | 5 | 11000 | 820 | 1050 | 18000 | 2100 | 2500 |
| 42 | 10 | 14000 | 1400 | 1800 | 22000 | 2900 | 3400 |
| 43 | 15 | 10000 | 1200 | 1500 | 16000 | 2600 | 3200 |
| 44 | 20 | 8000 | 700 | 930 | 12000 | 1900 | 2500 |

As seen from Table 10, when the addition amount of KOH exceeded 10 wt %, the volume percentages of hydrogen, methane gas and total organic compounds in the discharged gas decreased.

[Comparative Experiment 2: Comparison of $CO_2$ Production of Existing Method and the Present Disclosure]

Carbon (C) was reacted with water ($H_2O$) according to an existing method to produce a synthesis gas ($H_2$+CO). High-temperature heat is necessary to produce the synthesis gas and the heat is obtained from the reaction of carbon with oxygen ($O_2$). During this process, about 25% of the used carbon is converted to $CO_2$. If the synthesis gas produced from the reaction is used as a fuel, 6.45 MJ of heat is generated per 1 kg of $CO_2$ produced. To conclude, 1.33 kg of $CO_2$ is produced to obtain 6.45 MJ of heat according to the existing method.

In contrast, in the method according to the present disclosure, hydrogen and oxygen are produced as water is split by a solid acid. The produced oxygen is removed as it reacts with a reductive material (e.g., a metal such as iron or a low oxide such as ferrous oxide) included in rock. Consequently, only hydrogen remains as the product of the water splitting reaction. The hydrogen reacts with carbon (C) to produce a synthesis gas, usually consisting of $H_2$ and $CH_4$. The $H_2$+$CH_4$ synthesis gas generates 13.76 MJ of heat 1 kg of $CO_2$ produced. This means that 0.46 kg of $CO_2$ is produced to obtain 6.45 MJ of heat.

Accordingly, the production of a synthesis gas according to the present disclosure can remarkably reduce the generation of environmental pollutants such as carbon dioxide as compared to the existing method.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

INDUSTRIAL APPLICABILITY

The present disclosure relates to a method for producing a synthesis gas using a solid acid capable of remarkably decreasing production of environmental pollutants such as carbon dioxide, which includes producing hydrogen by reacting a solid acid with water and producing a synthesis gas by reacting the produced hydrogen with a carbon compound.

The invention claimed is:

1. A method for producing a synthesis gas, comprising:
 (a) adsorbing water by reacting a solid acid mixture comprising a carbon compound and a solid acid with water or steam;
 (b) producing hydrogen by introducing the water-adsorbed solid acid mixture into a reactor and splitting the water adsorbed on the solid acid mixture;
 (c) producing a synthesis gas by reacting the produced hydrogen with the carbon compound in the reactor; and
 (d) discharging the produced synthesis gas out of the reactor, wherein the solid acid is in powder form and the powder has a particle size of 500 mesh or greater.

2. The method for producing a synthesis gas according to claim 1, which further comprises introducing one or more material selected from a group consisting of a metal and an electrolyte into the solid acid mixture of (a).

3. The method for producing a synthesis gas according to claim 2, wherein the metal is one or more selected from aluminum, zinc, iron, cobalt, manganese, chromium, nickel and titanium or an alloy thereof.

4. The method for producing a synthesis gas according to claim 3, wherein the electrolyte is one or more selected from a group consisting of sodium chloride (NaCl), potassium chloride (KCl), sodium nitrate (NaNO3), potassium nitrate (KNO3), sodium sulfate (Na2SO4), potassium sulfate (K2SO4), lithium carbonate (Li2CO3), sodium carbonate (Na2CO3), potassium carbonate (K2CO3), sodium dihydrogen phosphate (NaH2PO4), sodium hydrogen phosphate (Na2HPO4), sodium hydroxide (NaOH), potassium hydroxide (KOH), calcium chloride (CaC2), magnesium chloride (MgC2), calcium nitrate (Ca(NO3)2), magnesium nitrate (Mg(NO3)2), calcium sulfate (CaSO4), magnesium sulfate (MgSO4), calcium hydroxide (Ca(OH)2), magnesium hydroxide (Mg(OH)2), sulfuric acid (H2SO4), phosphoric acid (H3PO4), nitric acid (HNO3) and hydrochloric acid (HCl).

5. The method for producing a synthesis gas according to claim 2, wherein the metal and the electrolyte are in powder form and the powder has a particle size of 500 mesh or greater.

6. The method for producing a synthesis gas according to claim 1, wherein a compressed gas is injected into the reactor in (b) or (c) and the produced synthesis gas is discharged out of the reactor in (d) as mixed with the compressed gas.

7. The method for producing a synthesis gas according to claim 6, wherein the compressed gas is one or more selected from a group consisting of hydrogen, nitrogen, argon, carbon monoxide, carbon dioxide, methane and steam.

8. The method for producing a synthesis gas according to claim 1, wherein the reactor in (b) or (c) is maintained at a temperature of 310-1400 K and at a pressure of 1 atm or higher.

9. The method for producing a synthesis gas according to claim 1, wherein (a)-(d) are repeated sequentially.

10. The method for producing a synthesis gas according to claim 1, wherein the carbon compound is one or more compound having the chemical formula $C\alpha H\beta O\gamma N\delta S\epsilon P\eta$ (C: carbon, H: hydrogen, O: oxygen, N: nitrogen, S: sulfur, P: phosphorus, $1 \leq \alpha \leq 100$, $0 \leq \beta \leq 200$, $0 \leq \gamma \leq 100$, $0 \leq \delta \leq 10$, $0 \leq \epsilon \leq 10$, $0 \leq \eta \leq 10$).

11. The method for producing a synthesis gas according to claim 1, wherein the solid acid is one or more selected from a group consisting of igneous rock such as basalt, granite, sedimentary rock such as limestone, sandstone, metamorphic rock such as shale, marble, zeolite, bentonite, kaolinite, attapulgite, montmorillonite, zinc oxide (ZnO), aluminum oxide (Al2O3), titanium oxide (TiO2), cerium oxide (CeO2), vanadium oxide (V2O5), silicon oxide (SiO2), chromium oxide (Cr2O3), calcium sulfate (CaSO4), manganese sulfate (MnSO4), nickel sulfate (NiSO4), copper sulfate (CuSO4), cobalt sulfate (CoSO4), cadmium sulfate (CdSO4), magnesium sulfate (MgSO4), iron sulfate (FeSO4), aluminum sulfate (Al2(SO4)3), calcium nitrate (Ca(NO3)2), zinc nitrate (Zn(NO3)2), iron nitrate (Fe(NO3)3), aluminum phosphate (AlPO4), iron phosphate (FePO4), chromium phosphate (CrPO4), copper phosphate (Cu3

(PO4)2), zinc phosphate (Zn3(PO4)4), magnesium phosphate (Mg3(PO4)2), aluminum chloride (AlC3), titanium chloride (TiC4), calcium chloride (CaC2), calcium fluoride (CaF2), barium fluoride (BaF2), calcium carbonate (CaCO3), magnesium carbonate (MgCO3), coal, activated carbon, graphite and charcoal.

12. The method for producing a synthesis gas according to claim 5, wherein the solid acid mixture in which the metal is further included has a structure in which a metal particle is deposited in a pore of the solid acid powder and the deposited metal particle has a diameter not greater than 10 μm.

13. The method for producing a synthesis gas according to claim 12, wherein the solid acid mixture in which the metal is further included has a structure in which a metal particle is coated on the surface of the solid acid powder or the solid acid powder is coated on the surface of the metal powder and the coated metal film or solid acid film has a thickness greater than 10 nm and not greater than 10 pm.

14. The method for producing a synthesis gas according to claim 5, wherein the solid acid mixture in which the electrolyte is further included has a structure in which an electrolyte particle is deposited in a pore of the solid acid powder or the metal powder and the deposited electrolyte particle has a diameter not greater than 10 pm.

15. The method for producing a synthesis gas according to claim 5, wherein the solid acid mixture in which the electrolyte is further included has a structure in which an electrolyte particle is coated on the surface of the solid acid powder and the metal powder or the solid acid powder is coated on the surface of the metal powder and the electrolyte powder and the coated electrolyte film or solid acid film has a thickness greater than 10 nm and not greater than 10 pm.

16. The method for producing a synthesis gas according to claim 1, wherein the solid acid mixture comprising the carbon compound and the solid acid comprises the carbon compound in an amount greater than 0.1 wt % and smaller than 50 wt % and comprises the solid acid in an amount not smaller than 50 wt % and not greater than 99.9 wt %.

17. The method for producing a synthesis gas according to claim 1, wherein the reactor is a multi-walled reactor comprising 70% or more of iron and comprises one or more material selected from a group consisting of SUS steel, carbon steel, a mixture of SUS steel and carbon steel, concrete, iron-reinforced concrete and a steel.

* * * * *

UNITED STATES PATENT AND TRADEMARK OFFICE
CERTIFICATE OF CORRECTION

PATENT NO. : 10,030,496 B2
APPLICATION NO. : 14/439224
DATED : July 24, 2018
INVENTOR(S) : Hong Gon Kim et al.

Page 1 of 1

It is certified that error appears in the above-identified patent and that said Letters Patent is hereby corrected as shown below:

In the Claims

Column 23, correct: Claim 13, Line 7, from "10 pm" to "10$\mu$m",
Column 24, correct: Claim 14, Line 6, from "10 pm" to "10$\mu$m", and
Column 24, correct: Claim 15, Line 8, from "10 pm" to "10$\mu$m".

Signed and Sealed this
Second Day of October, 2018

Andrei Iancu
*Director of the United States Patent and Trademark Office*